(12) United States Patent
Wyatt et al.

(10) Patent No.: US 7,890,925 B1
(45) Date of Patent: Feb. 15, 2011

(54) AUTOMATIC GENERATION OF CUSTOM DRIVER PACKAGES

(75) Inventors: David Wyatt, San Jose, CA (US); David J. Stenseth, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 985 days.

(21) Appl. No.: 11/696,906

(22) Filed: Apr. 5, 2007

(51) Int. Cl.
*G06F 9/44* (2006.01)
*G06F 9/445* (2006.01)

(52) U.S. Cl. ................... 717/106; 717/114; 717/168; 717/174

(58) Field of Classification Search .................. 717/106
See application file for complete search history.

(56) References Cited

U.S. PATENT DOCUMENTS

| | | | | |
|---|---|---|---|---|
| 5,787,246 | A * | 7/1998 | Lichtman et al. | 709/220 |
| 6,189,139 | B1 * | 2/2001 | Ladd | 717/135 |
| 6,237,144 | B1 * | 5/2001 | Delo | 717/174 |
| 6,301,710 | B1 * | 10/2001 | Fujiwara | 717/175 |
| 6,378,127 | B1 * | 4/2002 | Delo | 717/174 |
| 2003/0200532 | A1 * | 10/2003 | Gensel | 717/120 |
| 2005/0246704 | A1 * | 11/2005 | Romm et al. | 717/178 |

OTHER PUBLICATIONS

Choi et al. "Code generation for Linux device driver" Advanced Communication Technology, 2006, ICACT 2006. The 8th International Conference, vol. 1 pp. 734-737.*

* cited by examiner

*Primary Examiner*—Thomas K Pham
(74) *Attorney, Agent, or Firm*—Patterson & Sheridan, LLP.

(57) ABSTRACT

A structured INF source language that can coexist natively within higher level language source files is used to improve the consistency and quality of custom driver package components. A common source code file includes machine readable instructions in the structured inf source language for building various components of the custom driver packages for different target customer platforms. The number of errors introduced when changes are made for particular features, configuration, and customization keys is reduced by using a single source code file. The source code is parsed to automate the production of installation scripts, online internal documentation, and enabling per device, per platform, per operating system, and per customer control. An approval process with a security feature is used to ensure that the changes to the source code are authorized.

20 Claims, 5 Drawing Sheets

AUTOMATIC GENERATION OF CUSTOM DRIVER PACKAGES

BACKGROUND OF THE INVENTION

1. Field of the Invention

The present invention generally relates to software installation scripts (INF files) and more specifically to automatic generation of the INF files from device driver source code.

2. Description of the Related Art

Device information files (INF files) are a critical piece of the installation image which are used to configure the software that is installed, e.g. device drivers, for a target customer platform. An INF file is a text file that contains all the information necessary to install a device, such as driver names and locations, registry information, version information, operating system, hardware device version, and platform specific information that is necessary for correct operation and that may not be discoverable. Typically the INF files contain registry keys and values for those keys which are conditionally installed for various devices, platforms, operating systems, and hardware vendors.

Conventionally, INF files are generated manually, and then verified by visual inspection. Changes to features, configuration and customization of the registry keys in installation scripts are conveyed through manual process, by cross referencing documents and instructions received from engineers that articulate the behavioural effects of these registry keys in software source code. The process is time consuming and prone to errors. The various components of a custom driver package are prepared independently, so that inconsistencies may exist between the INF files, documentation, and enabling files. Changes in code or the operating system may require repeated manual adjustments of the documentation and the installation files. Sometimes the separate documentation of these registry keys diverges from actual behaviour in software or in the installation script. Yet this connection is critically important to determine the combination of registry keys and settings used in customer enabling in order to correctly configure and customize software for target customer platforms.

Accordingly, what is needed in the art are systems and methods for improving the quality of the various components of a custom driver package (documentation and installation scripts) by reducing the number of errors introduced during the editing process while also reducing the time needed to validate the changes.

SUMMARY OF THE INVENTION

Systems and methods that automatically produce various components of custom driver packages for different hardware configurations increase the quality of those custom driver packages by using a common source code file. A structured INF source language that can coexist natively within higher level language source files is used to represent machine readable instructions that are inserted into the common source code for building the various components. The number of errors introduced when changes are made for particular features, configuration, and customization keys is reduced by using the single source code file to produce each component of a custom driver package. The source code is parsed to automate the production of installation scripts, online internal documentation, and enabling per device, per platform, per operating system, and per customer control. An approval process with a security feature is used to ensure that the changes output in the custom driver packages are authorized. The structured INF source language enables improvements in consistency and quality of the custom driver packages.

Various embodiments of a method of the invention for generating custom driver package components include inserting commands specifying customization information for a registry key into source code for a custom driver package, checking that a syntax of the commands is valid, checking the commands into a database that stores the source code, parsing the source code to produce a component of the custom driver package based on the customization information, and processing the source code to produce an executable device driver that is configured to communicate with a device of a target platform.

Various embodiments of the invention for generating custom driver package components include a memory and a processor. The memory stores a source code file that is configured to define device driver functions and specify registry keys including customization information. The processor is configured to execute a build process to parse the source code and produce the device driver and the custom driver package components for a target platform based on the customization information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Using an automated process increases the consistency and quality of custom driver package components while reducing the time needed to introduce a change for features, configuration, and customization keys. The automated process allows for engineers to retain the ability to ensure that their changes appear correctly in builds for customer platforms, while reducing the number of errors caused by manual editing. Using a single source code base for the various components of the custom driver package ensures that the documentation and installation scripts (INF files) reflect the same behaviour and are consistent. The structured INF source language that can coexist natively within higher level language source files enables the insertion of machine readable instructions into the common source code for building the various custom driver package components.

System Overview

Figure 1:
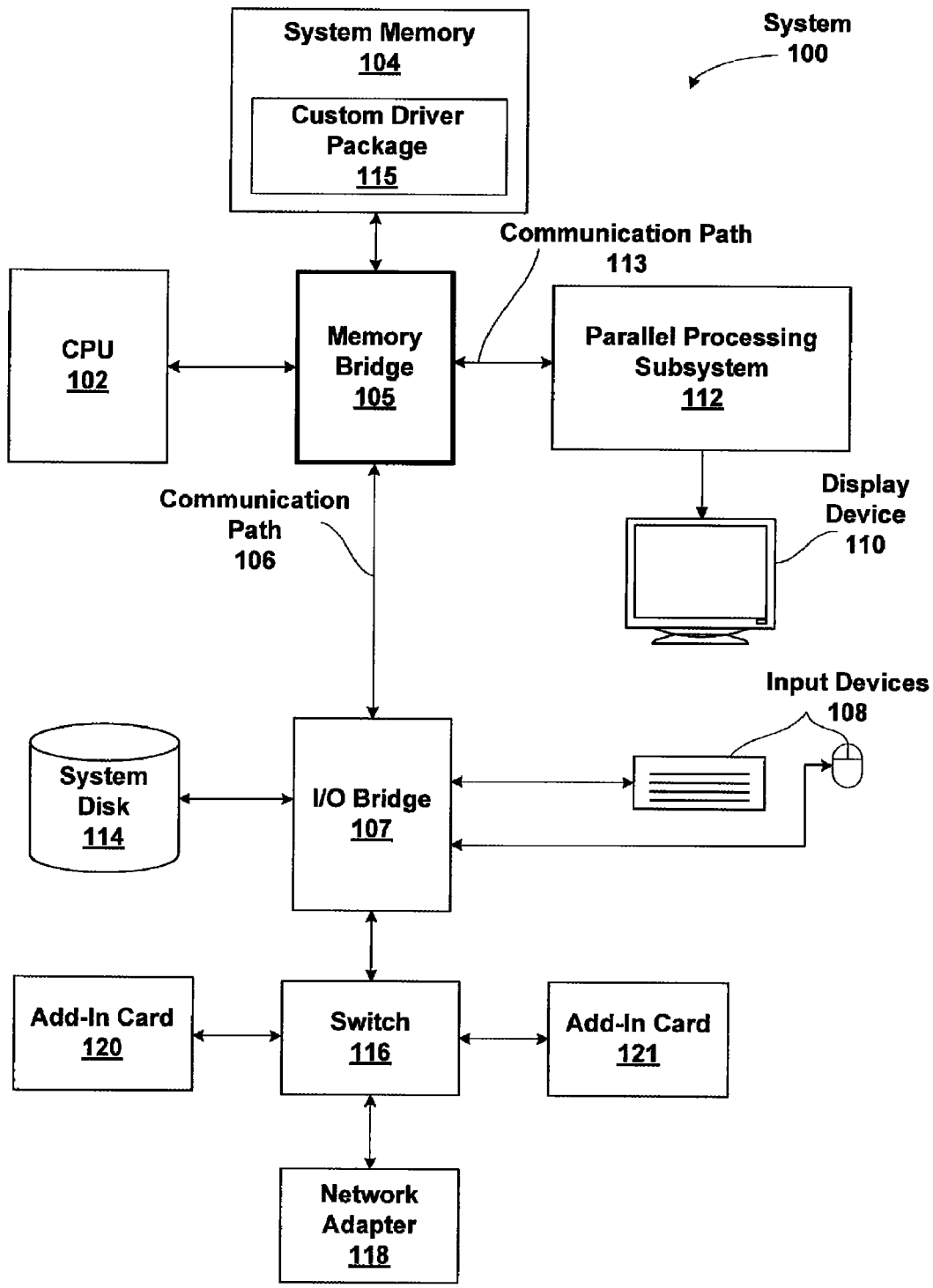
FIG. 1 is a block diagram illustrating a computer system configured to implement one or more aspects of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. System memory 104 includes a custom driver package 115 that is generated using the present invention, as described in conjunction with FIGS. 2, 3A, 3B, 4A, and 4B. A plurality of source code files are processed to produce various components of custom driver package 115. A custom driver package 115 includes OEM, Platform or Model specific configuration information (inf file) and device drivers corresponding to a processing system 112 that is executed by CPU 302 to translate instructions for execution by processing subsystem 112 based on the specific capabilities of processing subsystem 112. The instructions may be specified by an application programming interface (API) which may be a conventional graphics API such as Direct3D or OpenGL. The program instructions and data are produced by a software application and may be stored in system memory 104 or memory within other devices of system 100. Other components of custom driver package 115 are documentation and installation scripts. Additionally, other custom driver packages may be included in system memory for use with add-in card 120, add in card 121, and network adapter 118.

Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105.

A processing subsystem 112 is coupled to memory bridge 105 via a bus or other communication path 113 (e.g., a PCI Express, Accelerated Graphics Port, or HyperTransport link); in one embodiment processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of processing subsystem 112 to the rest of system 100 may also be varied. In some embodiments, processing subsystem 112 is implemented as an add-in card that can be inserted into an expansion slot of system 100. In other embodiments, a processing subsystem 112 can be integrated on a single chip with a bus bridge, such as memory bridge 105 or I/O bridge 107. In still other embodiments, some or all elements of processing subsystem 112 may be integrated on a single chip with CPU 102.

Processing subsystem 112 can be a graphics processor in a unified memory architecture (UMA) embodiment; in such embodiments, little or no dedicated graphics memory is provided, and processing subsystem 112 would use system memory exclusively or almost exclusively. In UMA embodiments, processing subsystem 112 may be integrated into a bridge chip or processor chip or provided as a discrete chip with a high-speed link (e.g., PCI-E) connecting the processing subsystem 112 to system memory, e.g., via a bridge chip.

Any number of engines can be included in processing subsystem 112. For instance, multiple engines can be provided on a single add-in card, or multiple add-in cards can be connected to communication path 113, or one or more of the engines could be integrated into a bridge chip. The engines in processing subsystem 112 may be identical to or different from each other; for instance, different engines might have different numbers of cores, different amounts of local memory, and so on. Where multiple engines are present, they may be operated in parallel to process data at higher throughput than is possible with a single engine.

Systems incorporating one or more processing subsystem 112 may be implemented in a variety of configurations and form factors, including desktop, laptop, or handheld personal computers, servers, workstations, game consoles, embedded systems, and the like.

Automatic Generation of Custom Driver Packages

Figure 2:
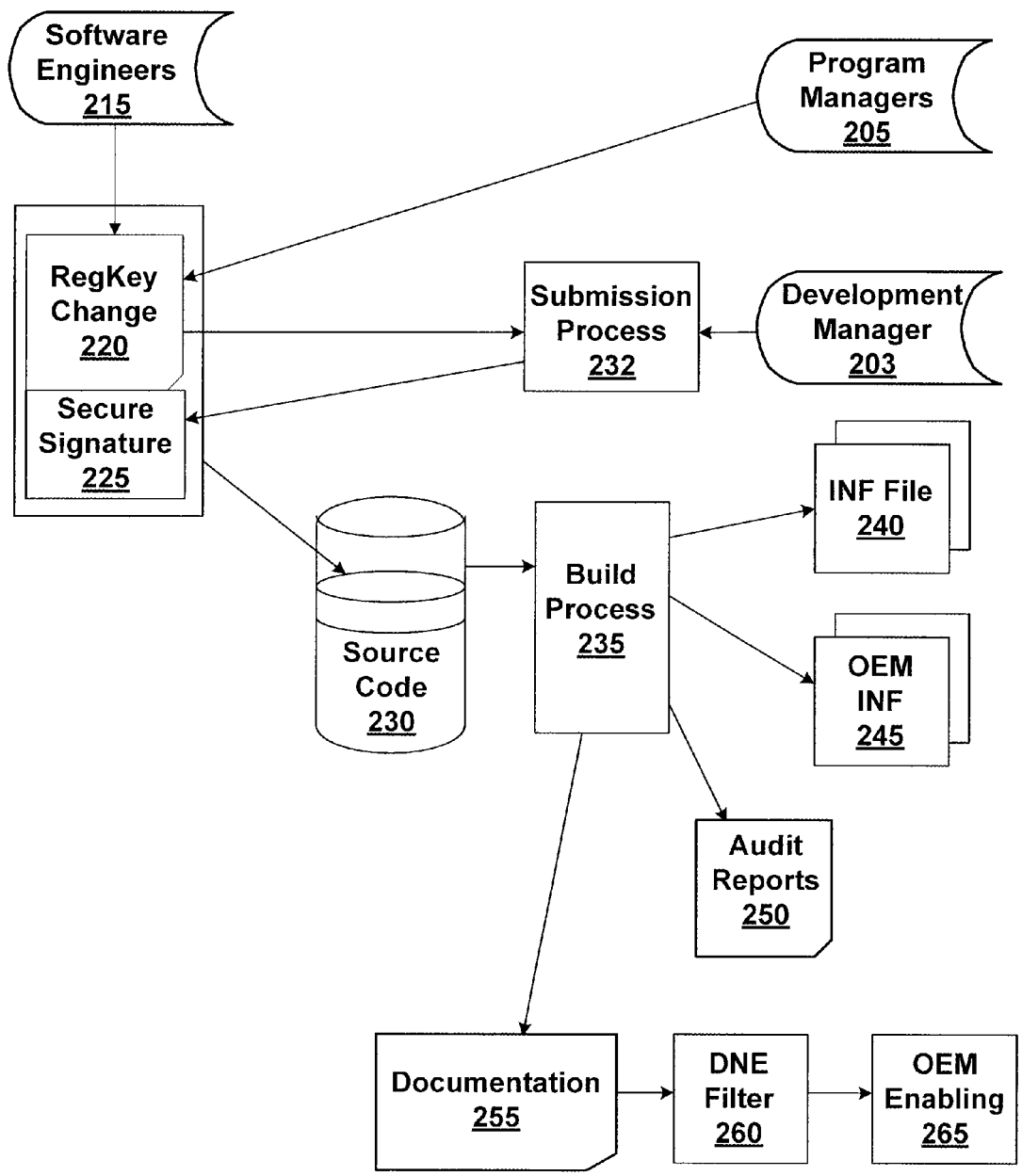
FIG. 2 is a conceptual diagram of the process used to incorporate commands into the source code and automatically produce custom driver package components in accordance with one or more aspects of the present invention.

FIG. 2 is a conceptual diagram of the process used to incorporate decorative comments into the source code and automatically produce custom driver package components, in accordance with one or more aspects of the present invention. Importantly, the structured INF source language used to represent the decorative comments can coexist natively within higher level language source files. Changes in the source code used to build the custom driver packages may be initiated by program managers 205 or software engineers 215 in response to business requirements, e.g., customer requests, bug fixes, operating system upgrades, new hardware features, new software features, or the like. A request for a registry key change 220 represents a portion of source code 230 that is changed or added based on a request made by program managers 205 or software engineers 215. Source code 230 is used to produce a device driver and the components of custom driver package 115.

The RegKey (registry key) change 220 enters a submission process 232 for peer review and approval by a person in the position of a development manager 203. Registry keys are used to express customization information specifying features and functionality, such as resource management, video, OpenGL, and the like. If regkey change 220 is approved, then a signature, secure signature 225, is generated as a one-way hash of the regkey change 220. Secure signature 225 is added at the end of the key definition section of source code 230 and regkey change 220 is checked into the database that stores source code 230. Secure signature 225 indicates that regkey change 220 has been approved and secure signature 225 can be validated before regkey change 220 is built as part of custom driver package 115.

In some embodiments of the present invention, registry keys are entered into a header file that is included in source code 230. When regkey change 200 and secure signature 225 are checked into the database they become part of the source code 230. Source code 230 is the unified code that is used during a build process 235 to produce the various components of custom driver package 115, such as documentation 255, INF file 240, and OEM INF file 245. Build process 235 is executed by a CPU, such as CPU 102, to parse source code 230 and process scripts that include commands to automatically generate the components of custom driver package 115. Source code 230 is stored in a memory that is accessible by the process that performs build process 235. Build process 235 may be configured to validate that secure signature 225 matches the registry key in source code 230 before producing INF files 240 and OEM INF files 245. A single regkey change 200 may be included in many OEM INF files 245 or may be included in only a single OEM INF file 245. Therefore, each regkey change 220 can be leveraged to produce custom driver packages for multiple customers and configurations.

Build process 235 can also be configured to produce audit reports 250. Audit reports 250 can be used to identify the number of registry key changes that do not have valid hashes and other characteristics of source code 230. Documentation 255 is input to DNE (do not enable) filter 260 to produce OEM enabling information 265. DNE filter 260 can be configured to remove registry keys that should not be exposed, such as registry keys for customer specific workarounds. OEM enabling information 265 is provided by an OEM team to communicate the customization options to different OEMs.

Source Code Customization

Descriptors representing registry keys are included in the custom driver package source code 230 using a scripting tool. Syntax commands of the structured INF source language are designed to be used within compiler header files to allow build process 235 to perform scripted post-processing to automatically generate custom driver packages including customer INF installation files 240, online documentation 255, auditing reports 250, and information for program managers and customer enabling 265. By using a single source code 230 to produce the various components of custom driver packages it is possible to avoid replication of engineering effort to maintain consistency between different files and reduce the opportunities for error when duplicating changes in multiple files.

TABLE 1 includes prior art code for a video post processing feature that is included in an INF file to enable various overdrive states for a LCD (liquid crystal display).

TABLE 1

Example of prior art INF file code

```
#define EnableOverDrive_Key     "EnableOverDrive"
// Global enable
#define EO_Global_On            0x10000000
// Split Screen Vertical On (demo only)
// Change added for Toshiba
#define EO_SplitScreen_Vert     0x10000010
#define EO_DefaultValue         0x0
```

In the prior art code shown in TABLE 1 four define instructions are used to specify the registry key name, two setting values, and a default value. Similar changes would be made in the documentation and any other components for each custom driver package that includes the LCD overdrive video post processing feature.

TABLE 2 includes example code for a registry key that decorates source code 230 to define the video post processing feature. In some embodiments of the present invention, the code for the registry key is included in a header file and in other embodiments it is included directly in source code 230. The header file is included within source code 230 in order to derive the various components of the custom driver package in a single source.

The syntax commands shown in TABLE 2 allow descriptive information about how to format the registry keys and values within INF files 240 and OEM INF files 245. Flags can be used to allow per-registry key and per-value controls. Specifically, flags may be used to enable visibility of features for particular customers, indicate supported devices, platforms, OEM's, operating systems, and the like. To help a CPU parse source code 230, the syntax commands are inserted in a defined format in the header file within C/C++ comments, bounding the actual definition of the registry key which is used within driver code included in source code 230.

TABLE 2

Example registry key code

```
// $BeginKey: VIDEO_MOD
// $FeatureGroup: LCD_OVERDRIVE
// $Platforms: MOBILE
// $Version: 95
// $KeyVisibility: OEM_VISIBLE
// $KeyPath: HKR
// $KeyName: "OverDrive Control"
// $ValueType: DWORD
// $ValueOptions: BitField
// $ValueRecommendation:    0x0
// $KeyDescription: "Enables various options for the LCD overdrive video post processing feature"
#define EnableOverDrive_Key   "EnableOverDrive"
// $ValueDescription: "Global enable"
#define EO_Global_On          0x10000000
// $ValueDescription: "Split Screen Vertical On (demo only)"
// $ValueVisibility: ENGINEERING_TEST_ONLY
#define EO_SplitScreen_Vert   0x10000010
// $ValueDescription: "Default value is Overdrive disabled"
// $SubmissionComments: 96.70, "Default value change for Toshiba bug 23486"
// $ValueDefault:
#define EO_DefaultValue  0x0
// $EndKey: 0x58CB9E12       // Signature
```

Note that the four define instructions used in TABLE 1 to specify the registry key name, two setting values, and a default value are included in the code shown in TABLE 2. Additional new commands are used to specify information needed for documentation, audit files, and the build process, as described further herein. The command is only recognized if on a line initiated by the C/C++ comment declaration: Spaces and other characters before the '//' are supported and will be ignored. Where applicable the command should precede the header definition to which it applies. Script commands to be parsed by build process 235 are prefixed by a '$' and follow the general syntax of: $<command>: <comma separated parameter(s)> Commands are case-insensitive.

There are three basic (non-exclusive) functions of commands, to assist script processing during the build process, to directly affect INF file generation, and for documentation purposes without affecting INF file generation. The two commands BeginKey and EndKey, bound the lines of code containing the registry key definition and the script processing. Therefore, processor commands begin after: $BeginKey: <Defined Group Owner> and end before a: $EndKey: <Hash>, as shown in TABLE 2. As build process 235 is parsing a registry key definition section it will assume default values for commands which are not present. The processor commands shown in TABLE 3 are minimally necessary even for documentation only purposes, and should be included in each registry key definition section. The registry key will not appear in an INF file 240 or 245 unless the syntax is correct and includes the minimally required fields.

TABLE 3

Necessary registry key definition commands

| | |
|---|---|
| $BeginKey | Demarks the beginning of a header key definition section |
| $KeyPath | A valid Key must have at least one path |
| $KeyDescription | A valid Key must have a purpose |
| $Visibility | The Key will not appear in INF unless Visibility is specified |
| $EndKey | Demarks the end of the header key definition |

The processor commands shown in TABLE 4 are not necessary, but are recommended for inclusion in the registry key code if build process 235 will produce INF file 240 or OEM INF 245.

TABLE 4

Recommended registry key definition commands

| | |
|---|---|
| $FeatureGroup | Links keys into groups representing a feature |
| $KeyName | A valid Key should have a human readable name |
| $ValueDescription | If a valid Key has values they must be defined |
| $Platforms | Applicable platforms e.g. for Mobile only Reg key |
| $SupportedOSs | Specifies applicable O/S's |
| $SupportedOEMSystems | |
| $Version | What releases the key works on |
| $SubmissionComments | |

Some processor command lines must be arranged next to lines of code so build process 235 can pick up text from the header code define. For example:

```
// $KeyDescription: "Options controlling Video processing for overdrive"
#define EnableOverDrive_Key    "EnableOverDrive"
```

And:

```
// $ValueDescription: "Globally enable overdrive"
#define EO_Global_On         0x10000000
```

The next non-comment line after ValueDescription will be parsed by the build process 235 to extract the value field 0x10000000 from the C header definition, which is then included in INF file 240 or OEM INF 245 and documentation 255 by build process 235.

Other additional command modifiers that apply additional meaning to the registry key or value are inserted in between $ . . . Description, and the C define, for example:

```
// $ValueDescription: "Globally enable overdrive"
// $ValueVisibility: OEM_USABLE_DONT_ADVERTISE
// $SubmissionComments: 96.70, "Default value change for Toshiba bug 23486"
// $ValueDefault:
#define EO_Global_On         0x10000000
```

Command parameters separated by a '|' are mutually exclusive options. For example, the following are not combinable options, and only one may be provided: DWORD|SZ|MULTI_SZ|BIN. Parameters may be expressed as comma delimited strings, numbers in C base formats (0x58CB9E12, 96.70, 42), pre-defined constants (MOBILE, DESKTOP, WIN2K, VIDEO_MOD), and defined constants (BUILD__1312).

A constant definition command, $Define: <Constant Name> <Parameter> defines a Constant to an optionally provided Parameter. The association applies from the point of definition onwards across all definitions sections. An example of the constant definition command is used to define a constant "R85": $Define: BUILD_R85 "R85"

A begin key section command, $BeginKey: <Defined Group Owner> is used to declare the beginning of the Registry Key definition and the module owner of the definition. This is required for key processing. In some embodiments of the present invention, <defined group name> can be: VIDEO_MOD, RM_MOD, DISPLAY_MOD, D3D_MOD, OPENGL_MOD, CPL_MOD, or UNKNOWN_MOD (Default) or other abbreviated token names used to represent which functional organization group owns or is responsible for the key entry.

An end key command, $EndKey: <Signature> is used to declare the end of the Registry Key and optionally a hash of the section. Like the begin key section command, this command is also required for key processing. <Signature> is an optional one-way hash of the key definition section. If used, this will be auto-generated by submission process 232 for insertion into source code 230 and build process 235 for checking during generation of custom driver package 115.

A feature group command, $FeatureGroup: <defined feature name> is used to specify the product feature to which this key belongs. This is a documentation syntax but may also affect how keys are grouped within an INF file. The operand <defined feature name> may be a pre-defined or variable name. The feature group command may be used as follows:
    // $Define: LCDO "LCD Overdrive"
    // $FeatureGroup: LCDO A key path command, $KeyPath: <Key Hive>, <Path> specifies which type of Registry Hive Key this Registry Key belongs under. This affects how the key is incorporated in the INF. Multiple KeyPath's can be entered for the same key. In some embodiments of the present invention, <Key Hive> is one or more of the following: HKR (Default, installation relative path), HKCR (class root), HKCU (current user), and HKLM (local machine). The key path command may be used as follows:

// $KeyPath: HKCU, "Software\NVIDIA Corporation\Global\NVSvc"

// $KeyPath: HKLM, "Software\NVIDIA Corporation\Global\NVSvc"

A version command, $Version: <Initial>, <Final> specifies the releases to which a particular registry key will be conveyed in documentation form. This command may contain one or two parameters which may be numerical or text. If a single version number is supplied, the registry key applies to the indicated build and forward. If two versions are supplied this represents a range within which when the registry key was applicable. An example of the version command to specify that the registry key applies to release 95.00 and forward is: // $Version: 95.

A key name command, $KeyName: <Key Name> specifies the human readable name of the registry key, which will be used as the heading when output in any documentation form. If none is provided then the name found in the define under key description will be used. An example use of the key name command is: // $KeyName: "Overdrive Control"

A key description command, $KeyDescription: <Descriptive comments> specifies descriptive text as to the purpose and usage of the registry key, preceding where a registry key is defined. This command will cause the next non-comment line to also be included in documentation, and will cause build process 235 to use the parsed Key Name. The key description command may be used as follows:

---
// $KeyDescription: "Options controlling Video processing for overdrive compensation of LCD latency"
define EnableOverDrive_Key    "EnableOverDrive"
---

A value description command, $ValueDescription: <Descriptive comments> is used to provide descriptive text as to the purpose and usage of the Value, preceding where a Value is defined. This command will cause the next non-comment line to also be included in documentation, and will cause build process 235 to use the parsed Value. The value description command may be used as follows:

---
// $ValueDescription: "Globally enable overdrive"
define EO_Global_On        0x10000000
---

A value type command, $ValueType: <Value Type> is used to declare the Value to be one of the pre-defined types. This is used to generate the INF file section type correctly and affects how the key is incorporated in the INF by build process 235. In some embodiments of the present invention, <Value Type> is one or more of the following: DWORD (32 bit value), SZ (string), MULTI_SZ (unicode string), BIN (binary value). An example use of the value type command is: // $ValueType: DWORD.

A value default command, $ValueDefault: <Value> is used to provide a default value when no registry key value is provided. If no parameter is provided then the value in the subsequent non-comment line is assumed as the default. This affects how the key is incorporated in the INF file by build process 235. The value description command may be used as follows:

---
// $ValueDefault:
define EO_DefaultValue        0x0
---

A value recommendation command, $ValueRecommendation: <Value> is used to provide a recommended value which should be used in most cases for enabling most customers. This is a documentation only syntax.

A value format command, $ValueFormat: <Format Options> is used to declare a Value to use either a enum or bit-field style for values. This affects INF file generation. In some embodiments of the present invention, <Format Options> is one or more of the following: ENUM (Default, has one or more options as defined values) or BITFIELD (Combines options as bits within the value field). An example use of the value format command is: If $ValueOptions: ENUM.

Submission comments may be included in regkey change 220 to provide additional information on changes using a command, $SubmissionComments: <Version>, <Descriptive text>. This is a documentation only syntax and must include a version number (string or numeric) as well as text. Including the date is also strongly recommended. An example use of the submission comments command is: // $SubmissionComments: 96.70, "9/1/06, Change added for Toshiba"

A key visibility command, $KeyVisibility: <Options> is used to assert if/how the Registry Key should be enabled externally. This is a documentation only syntax. In some embodiments of the present invention, <Options> is one or more of the following: ENGINEERING_TEST_ONLY (Default, not exposed externally), OEM_USABLE_DONT_ADVERTISE (selectively enabled), and OEM_VISIBLE (provided to OEM's an option). The value description command may be used as follows:

// $KeyDescription: "Foobar workaround enable"
// $KeyVisibility: OEM_USABLE_DONT_ADVERTISE A value visibility command, $ValueVisibility: <Options> is used to assert if/how specific Values of a Registry Key should be enabled externally. This must follow a $ValueDescription command and precede the actual Value #define. By default all values are exposed if the key is exposed. This affects which INF files will include the key. In some embodiments of the present invention, <Options> is one or more of the following: ENGINEERING_TEST_ONLY (not exposed externally), OEM_USABLE_DONT_ADVERTISE (selectively enabled), OEM_VISIBLE (Default, provided to OEM's). The value visibility command may be used as follows:

---
// $ValueDescription: "Split Screen Vertical On (demo only)"
// $ValueVisibility: OEM_USABLE_DONT_ADVERTISE
define EO_SplitScreen_Vert        0x10000010
---

A supported OS command, $SupportedOS: <OS> is used to specify an operating system (OS). The provided Value is the default which is used when no registry key value is provided. This affects what and how INF files are produced. In some embodiments of the present invention, <OS> is one or more of the following: ALL (Default, all supported O/S's), WIN2K (Windows*2000 and all service packs), WINXP (Windows*XP and all service packs), VISTA_RTM (Windows*Vista as first released to manufacturing), and $NOT(<OS(s)>) where the specified O/S's are not supported. An example use of the supported OS command is: // $SupportedOS: WINXP, VISTA_RTM.

A platforms command, $Platforms: <Platform Options> is used to assert the platforms on which the key should be applicable. This affects which INF file will include this key. In some embodiments of the present invention, <Options> is one or more of the following: ALL (default), MOBILE, DESKTOP, WORKSTATION, and $NOT(<Platform(s)>) where the specified platforms are not supported.

A supported OEM systems command $SupportedOEMSystems: <Systems>, is used to assert the platforms on which the registry key should be applicable. This affects which INF files will include the registry key. In some embodiments of the present invention, <Systems> is one or more of the following: ALL (default), <SVID> (a 16 bit Subsystem Vendor ID in hex indicating the system manufacturer), <SVID-SID> (a 32 bit Subsystem Vendor & Device ID indicating a specific product), $NOT(<Systems>) where the specified systems are not supported. The following is an example where the defined registry key is supported on a specific companies platform, but not systems from an other OEM:
    $SupportedOEMSystems: <01CC>, $NOT(<1000>, <1002>, <1003>).

A supported adapters command, $SupportedAdapters: <Adapters> is used to assert the adapters to which the key should be applicable. This affects which INF files will include the registry key. In some embodiments of the present invention, <Systems> is one or more of the following: ALL (default), <VID> (a 16 bit Subsystem Vendor ID in hex indicating the manufacturer), <VID-DID> (a 32 bit Subsystem Vendor & Device ID indicating a specific product), <VID-DID-SVID> (a 48 bit Vendor-Device and Subsytem Vendor ID), <VID-DID-SVID-SID> (a 64 bit Vendor-Device and full Subsytem ID, and $NOT(<Adapters>) where the specified adapters are not supported. The following is an example where the defined registry key applies only to NVIDIA Quadro NVS 120M: $SupportedAdapters: <10DEO1D8>.

Figure 3A:
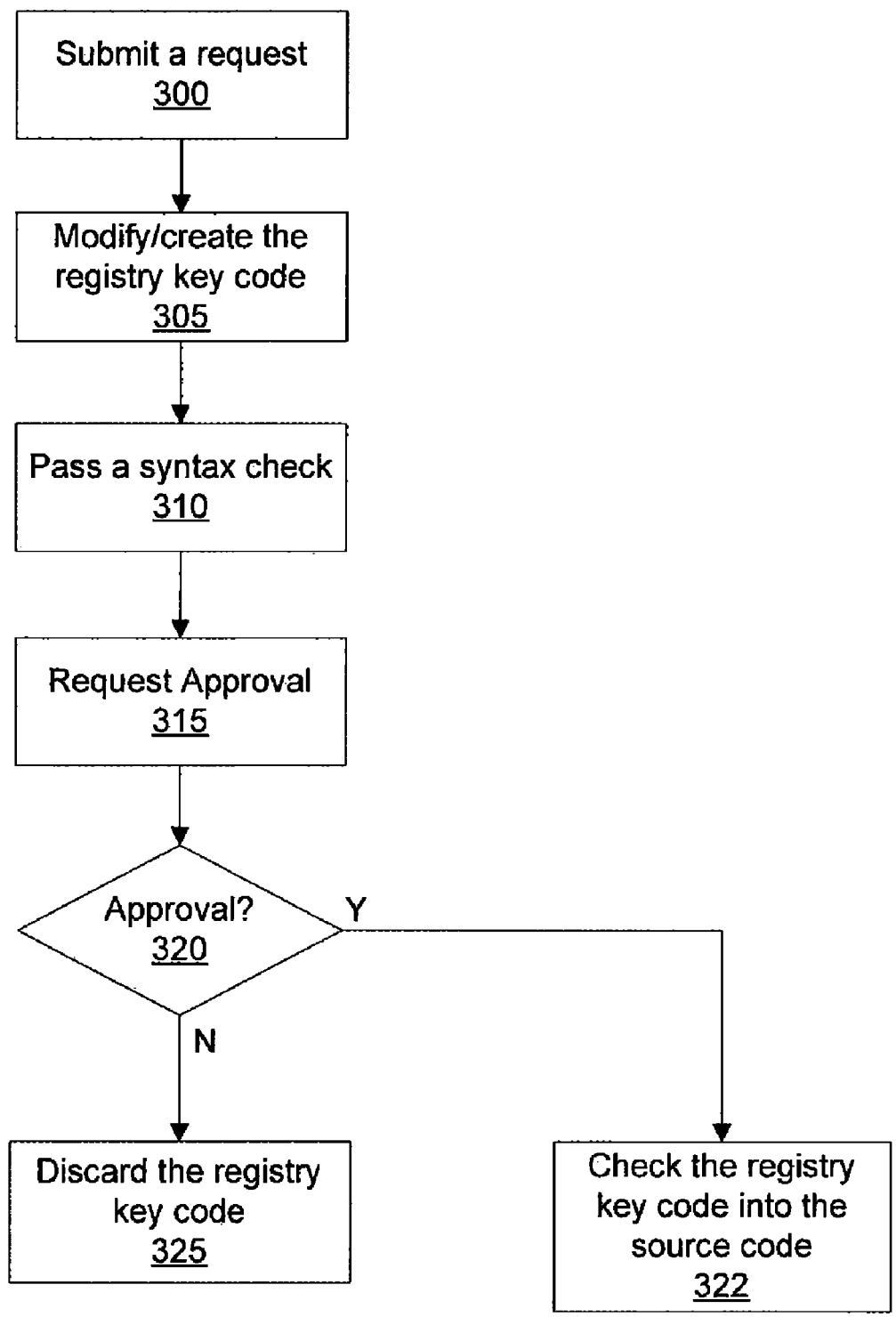
FIG. 3A is a flow diagram of method steps for incorporating commands for customization of registry keys into the source code in accordance with one or more aspects of the present invention.

FIG. 3A is a flow diagram of method steps for incorporating the previously described commands specifying customization for a registry key definition into source code 230, in accordance with one or more aspects of the present invention. In step 300 a request for a change to an existing registry key or a new registry key is received from software engineers 215 or program managers 205. In step 305 a portion of source code 230 for a registry key is modified or a new registry key is created to produce regkey change 220 that corresponds to the request. In step 310 the scripting command syntax used in regkey change 220 is checked by submission process 232 and when the syntax check is passed submission process 232 proceeds to step 315.

In step 315 approval for including regkey change 220 in source code 230 is requested via submission process 232. During submission process 232 regkey change 220 may be reviewed for quality and accuracy. Development manager 203 determines whether or not regkey change 220 is approved for inclusion in source code 230, and, in step 320 if approval is not received, regkey change 220 is discarded. Development manager 203 may provide approval for a submitted regkey change 220 to submission process 232 electronically. In step 322 an approved regkey change 220 is checked into the database that stores source code 230.

Figure 3B:
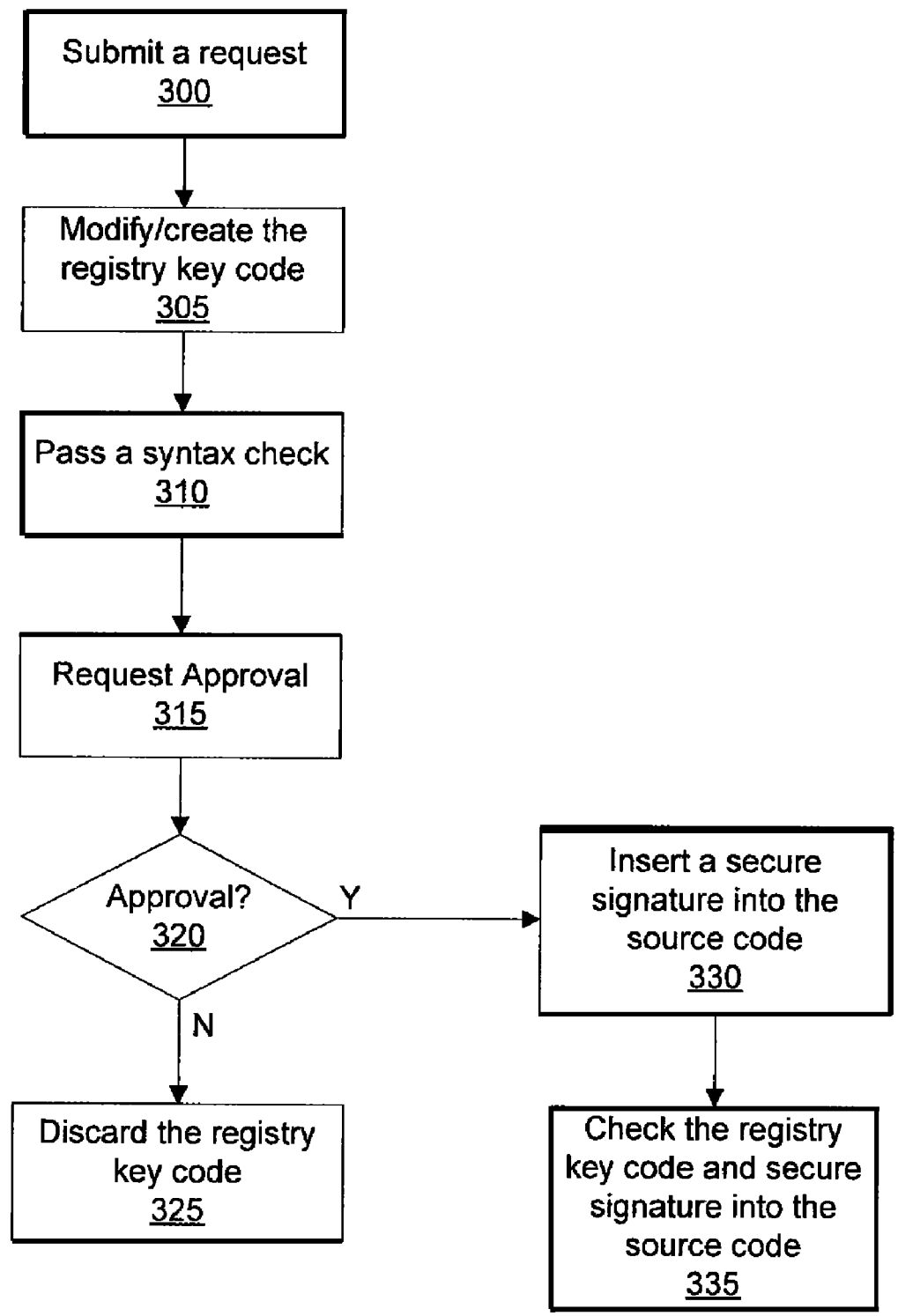
FIG. 3B is a flow diagram of method steps for incorporating commands for customization of registry keys into the source code with an approved hash for security in accordance with one or more aspects of the present invention.

FIG. 3B is a flow diagram of method steps for incorporating commands specifying customization for a registry key definition into source code 230 with a secure signature, in accordance with one or more aspects of the present invention. Steps 300, 305, 310, 315, 320 and 325 are completed as described in conjunction with FIG. 3A. In step 330 submission process 232 inserts a secure signature corresponding to regkey change 220 into source code 230 to indicate that regkey change 220 was approved. In some embodiments of the present invention, the secure signature is computed as a one-way hash of the text of regkey change 220 using the SHA-1 algorithm, however any other non-obvious cryptographic hashing algorithms, keyed integrity checking function such as CRC-32 will also work. In step 322 approved regkey change 220 and the secure signature corresponding to approved regkey change 220 are checked into the database that stores source code 230.

The secure signature mechanism includes generating the secure signature, inserting the secure signature into source code 230, and validating the secure signature when source code 230 is processed by build process 235. Although the secure signature mechanism is described in the context of source code 230 for producing custom driver packages, the secure signature mechanism may be used to certify changes to any type of source code file.

Figure 4A:
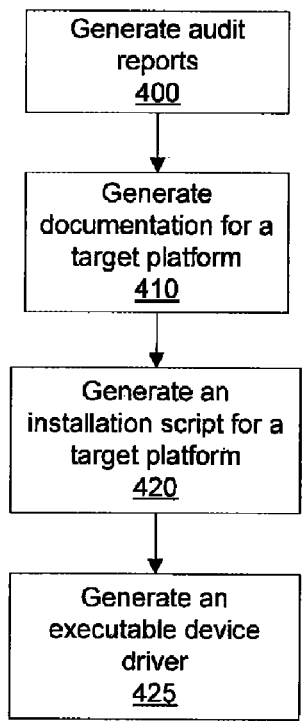
FIG. 4A is a flow diagram of method steps for automatically producing custom driver package components in accordance with one or more aspects of the present invention.

FIG. 4A is a flow diagram of method steps for automatically producing custom driver package 115 that includes INF files 240 or OEM INF files 245, and documentation 255, in accordance with one or more aspects of the present invention. In step 400 build process 235 parses source code 230 to generate audit reports 250 as a component of custom driver package 115. In step 410 build process 235 parses source code 230 to generate documentation 255, e.g., printed, electronic, or the like, as a component of custom driver package 115 for a target platform. The portion of source code shown in TABLE 2 is processed by build process 235 to produce the portion of custom driver package documentation 255 shown in TABLE 5.

TABLE 5 custom driver package documentation

Owner: VIDEO Module
FeatureGroup: OverDrive
Path: HKR
Name: OverDrive Control
Description: Enables various options for the LCD overdrive video post processing feature. Applies to release 95 and above.
Key Type: OEM Visible option in INF, Mobile Platforms Only
Key: EnableOverDrive
Value Type: DWORD formatted BitField
Possible Values: Meaning:
0x10000000 Global enable
0x10000010 Split Screen Vertical On (demo only)
Note: this value is for internal Engineering Test purposes ONLY
0x00000000 Default value is Overdrive disabled Note: Default value changed for Toshiba bug 23486, applies to version 96.70 and above.

In step 420 build process 235 parses source code 230 to generate an installation script as a component of custom driver package 115. TABLE 6 includes a portion of an installation script that is produced from the portion of source code shown in TABLE 2.

TABLE 6

Installation script

[nv_NvOverDrive_AddReg]
HKR,, EnableOverDrive, %REG_DWORD%, 0x0

In step 425 source code 230 is processed in build process 235 to produce an executable device driver binaries and also the installation scripts. In some embodiments of the present invention, the device driver is unified, meaning that it can be used with any of the target platforms provided by any vendor. Importantly, the same source code is used to produce the device driver and the various components of custom driver package 115.

Figure 4B:
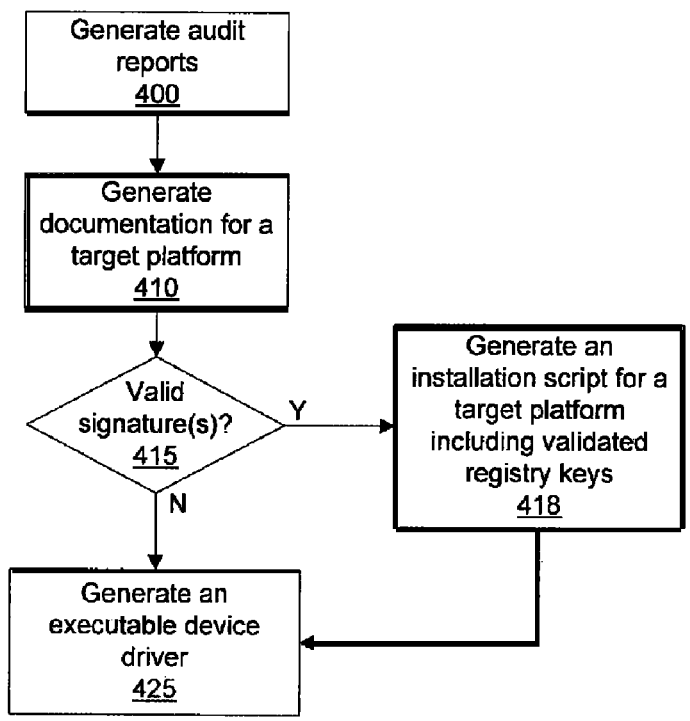
FIG. 4B is a flow diagram of method steps for verifying the hash and automatically producing custom driver package components in accordance with one or more aspects of the present invention.

FIG. 4B is a flow diagram of method steps for verifying the secure signature and automatically producing custom driver package 115, in accordance with one or more aspects of the present invention. Steps 400, 410, 420, and 425 are completed as described in conjunction with FIG. 4A. In step 415, build process 235 determines if any of the secure signatures included for the registry keys are valid. Registry keys that do not have secure signatures or valid secure signatures are not output as part of one or more components of custom driver package 115. In other words registry keys that are not valid may not by included in one or more of OEM INF files 245, INF files 240, documentation 255, and OEM enabling 265. In step 418 build process 235 parses source code 230 to generate an installation script including the validated registry keys as a component of custom driver package 115 before proceeding to step 425. If, in step 415, build process 235 determines none of the secure signatures included for the registry keys are valid, then the registry keys are not included in an installation script.

The structured INF source language enables improvements in consistency and quality of the custom driver packages. Using a common source code to produce the device driver and the custom driver package components allows for engineers to retain the ability to ensure that their changes appear correctly in builds for customer platforms, while reducing the number of errors caused by manual editing. The automated build process advantageously increases the quality of custom driver package components while reducing the time needed to introduce a change for features, configuration, and customization keys. In addition to allowing for automatic generation of the production of installation scripts, online internal documentation, and enabling per device, the script commands written in the structured INF source language that are inserted into the source code allow per platform, per operating system, and per customer control for each registry key.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for generating custom driver package components, comprising:
   inserting commands specifying customization information for a registry key into source code for a custom driver package;
   checking that a syntax of the commands is valid;
   checking the commands into a database that stores the source code;
   parsing the source code to produce a component of the custom driver package based on the customization information; and
   processing the source code to produce an executable device driver that is configured to communicate with a device of a target platform.

2. The method of claim 1, wherein the component of the custom driver package is documentation.

3. The method of claim 2, further comprising the step of passing the documentation through a filter to remove any registry keys that should not be included in the documentation.

4. The method of claim 1, further comprising the step of inserting a secure signature into the source code that indicates the registry key has passed an approval process.

5. The method of claim 4, further comprising the step of computing the secure signature as a hash of the commands specifying customization information for the registry key.

6. The method of claim 1, wherein the component of the custom driver package is an installation script.

7. The method of claim 1, wherein the customization information specifies the target platform type.

8. The method of claim 1, wherein the customization information specifies a recommended value for a setting.

9. The method of claim 1, wherein the component of the custom driver package is an audit report.

10. The method of claim 1, wherein the customization information specifies an operating system of the target platform.

11. A computer-readable medium containing instructions for controlling a computer system to generate custom driver package components, comprising:
    inserting commands specifying customization information for a registry key into source code for a custom driver package;
    checking that a syntax of the commands is valid;
    checking the commands into a database that stores the source code;
    parsing the source code to produce a component of the custom driver package based on the customization information; and
    processing the source code to produce an executable device driver that is configured to communicate with a device of a target platform.

12. The computer-readable medium of claim 11, wherein the customization information specifies a visibility of the registry key that controls whether or not the registry key is enabled in the component of the custom driver package.

13. The computer-readable medium of claim 11, wherein the customization information specifies vendor devices that are supported by the registry key.

14. The computer-readable medium of claim 11, wherein the customization information specifies a human readable name of the registry key and a human readable description of the purpose of the registry key.

15. The computer-readable medium of claim 11, wherein the customization information specifies a key group that the registry key is associated with.

16. A system for generating custom driver package components, comprising:
- a memory storing a source code file that is configured to define device driver functions and specify registry keys including customization information; and
- a processor configured to execute a build process to parse the source code and produce the device driver and the custom driver package components for a target platform based on the customization information.

17. The system of claim 16, wherein a component of the custom driver package is an audit report.

18. The system of claim 16, wherein a component of the custom driver package is an installation script.

19. The system of claim 15, wherein a component of the custom driver package is documentation.

20. The system of claim 15, wherein the processor is further configured during execution of the build process to insert a secure signature into the source code that indicates a registry key has passed an approval process.

* * * * *